United States Patent
Hubacek et al.

(10) Patent No.: US 8,002,237 B2
(45) Date of Patent: Aug. 23, 2011

(54) SEAT ARRANGEMENT WITH CAVITY PRESSURE RELIEF FOR A BALL VALVE

(75) Inventors: Mirek Hubacek, Montgomery Center, VT (US); Luc Vernhes, Montreal (CA); Jocelyn Deslandes, Granby, CA (US)

(73) Assignee: Velan Inc., Quebec (CA)

( * ) Notice: Subject to any disclaimer, the term of this patent is extended or adjusted under 35 U.S.C. 154(b) by 471 days.

(21) Appl. No.: 12/269,127

(22) Filed: Nov. 12, 2008

(65) Prior Publication Data

US 2010/0117019 A1    May 13, 2010

(51) Int. Cl.
*F16K 5/06* (2006.01)
(52) U.S. Cl. ... 251/172; 251/175; 251/192; 251/315.01; 251/317; 277/641; 277/644; 277/928
(58) Field of Classification Search .................. 251/172, 251/175, 314, 316, 317, 315.01, 359, 360; 277/641, 644, 928
See application file for complete search history.

(56) References Cited

U.S. PATENT DOCUMENTS

| | | | | |
|---|---|---|---|---|
| 3,488,033 A | * | 1/1970 | Priese | 251/172 |
| 4,157,170 A | * | 6/1979 | McClurg | 251/315.01 |
| 4,236,691 A | | 12/1980 | Wright | |
| 4,385,747 A | | 5/1983 | Renaud, Jr. et al. | |
| 4,557,461 A | * | 12/1985 | Gomi et al. | 251/172 |
| 4,681,326 A | * | 7/1987 | Kubo | 277/447 |
| 6,938,879 B2 | * | 9/2005 | Bancroft et al. | 251/306 |

FOREIGN PATENT DOCUMENTS

CN    2653241 Y    11/2004

* cited by examiner

*Primary Examiner* — John Bastianelli
(74) *Attorney, Agent, or Firm* — Gardner, Linn, Burkhart & Flory, LLP

(57) ABSTRACT

A ball valve seat arrangement is provided that permits relief of cavity pressure. The arrangement includes a valve body for receiving a resilient annular seat. First passages in the seat provide communication between the valve cavity, and a space formed between the seat and the valve body. When the cavity pressure reaches a certain level, a sealing point between the seat and the valve body is lost. Communication is thereby provided between the space and the valve passage to achieve cavity pressure relief.

14 Claims, 3 Drawing Sheets

SEAT ARRANGEMENT WITH CAVITY PRESSURE RELIEF FOR A BALL VALVE

FIELD OF THE INVENTION

The present invention relates generally to a ball valve seat arrangement.

BACKGROUND OF THE INVENTION

A ball valve is a valve that opens and closes by rotation of a ball. The ball has a port therethrough such that when the port is in line with ends of the valve, flow will occur. The ball sits in, and is sealed by, valve seats.

As is well known, a main requirement in the manufacture of ball valves is that an effective seal be maintained between the valve seats and the ball at all times. Many and varied forms of annular seats have been devised for this purpose.

One ball valve seat arrangement is described in U.S. Pat. No. 3,384,341 to Ripert ("Ripert"). A main feature of that invention resides in the cross-sectional shape of the seats (or sealing rings) that is formed to have a somewhat arcuate overall formation with a substantially concave outer surface and a substantially convex inner surface. When pressure is applied to the inner surface, by contact with the ball, it tends to flex inwardly and due to the concavity of the outer surface, the middle portion of the ring increases in circumference under tension. By way of background, the valve of Ripert will be described in further detail with reference to FIGS. 1 to 3 herein. With particular reference to FIG. 1 of Ripert, a portion of a typical ball valve construction is shown as consisting of a two piece valve body 10, having a main portion 12 including a tapped bonnet portion 14 receiving a valve spindle 16. The main body 10 is recessed axially to provide a fluid inlet 18 and an enlargement 20 constituting a valve chamber 21. The outer end of the enlargement 20 is tapped to threadably receive the minor portion of the valve body 22, which is also recessed axially to provide a fluid inlet 24. The inner ends of the fluid inlets 18 and 24 are each provided with sealing ring accommodating grooves 30 into which is adapted to fit sealing ring 32. The terminal end 17 of the spindle 16 is shaped in rectangular form to fit loosely with a corresponding slot 33 and a ball 34. Rotation of the spindle 16 causes a corresponding rotation of the ball 34, which includes an axial recess 35, between open and closed positions relative to the fluid inlets 18 and 24 with the sealing rings 32 acting to maintain the seal between the outer spherical surface of the ball and opposed portions of the valve body surrounding the fluid passages. FIG. 2 shows a sealing ring in perspective and partially broken view of Ripert, in which concave outer surface 50 and convex surface 52 are identified. In operation, and assuming that the spacing between the opposed ring accommodating grooves 30 is such that a minimum deflection only of the sealing rings 32 as shown in FIG. 3 is necessary, the outer surface of the ball 34 (FIG. 1) bears against the apex 57 of the inner surface of the ring so that it is urged inwardly along the centre as indicated by the arrow A. The deflection of the ring 32 in the direction A, due to the concave outer surface 50, places the ring under tension causing it to bear against the ring accommodating groove 30 along the direction of the arrows B and C bringing the surfaces 51 and 54 more tightly against the groove surfaces 61 and 63. At the same time, a convex inner surface is altered, as indicated at D, conforming to the curvature of the ball 34. The preferred minimum deflection illustrated in FIG. 3 will give the desired maximum sealing effect with the minimum of friction contact with the ball 34 making for ease in valve adjustment but the same maximum sealing effect is obtained with a condition of maximum deflection of the sealing ring, as shown in FIG. 3, without seriously affecting the friction resistance by the contact of the sealing rings with the ball 34. In effect, any deflection of the sealing rings by the ball outer surface bearing on the inner surface 51 of the ring increases the circumference while placing the ring under tension giving the desired sealing effect in the directions B and C. In other words, when the ball 34 abuts the convex surface 52, it will stretch or expand the circumference of the convex surface 52 thus placing it under tension. The spacing of the concave surface 50 from the connecting surface or inclined surface wall 65 of the groove 30 allows the ring to be placed under tension on bearing of the surface 52 by the ball 34. The sealing ring may also be in an alternative form by having a smooth arcuated inner surface rather than a surface with an apex. The same principles of deflection apply.

In the ball valve seat arrangement of Ripert, pressure rises in the valve chamber 21 (or valve cavity). Also, in Ripert there is a space between the concave surface 50 and the wall 65 of the groove 30 and pressure also rises in this space. Such pressure rise in these areas is not desirable. It would therefore be desirable to have a ball valve seat arrangement where relief of the cavity pressure, or pressure in the aforementioned space, could be achieved. Although the ball valve seat arrangement of Ripert has been discussed above, relief of cavity pressures in ball valve seat arrangements of different forms would also be desirable.

SUMMARY OF THE INVENTION

It is an object of the present invention to obviate or mitigate at least one disadvantage of previous designs.

In a first aspect, the present invention provides a ball valve seat arrangement comprising: a valve body; and a resilient annular seat for sealing between the seat and a valve member, the valve member being at least partially spherical, the seat comprising: a valve member contacting portion for contacting the valve member; and a valve body contacting portion for contacting the valve body and forming a space therebetween and a sealing point therewith; the seat defining one or more first passages for providing communication between a valve cavity, and the space; the seat defining one or more second passages which, but for the sealing point, would communicate the space with a valve passage to allow gas to vent from the space through the one or more second passages into the valve passage; the seat further comprising an inner peripheral portion, being disposed at an inner perimeter of the seat, and being distanced from an adjacent valve body surface defining a gap when the valve cavity is at a pressure less than a threshold pressure, and being movable, in the gap, towards the adjacent valve body surface upon the valve cavity reaching the threshold pressure, whereby sealing at the sealing point is lost thereby allowing gas to vent from the space through the one or more second passages into the valve passage to reduce the valve cavity pressure.

In one embodiment, the seat further comprises an outer peripheral portion, being disposed at an outer perimeter of the seat, contacting another adjacent valve body surface.

In another embodiment, the one or more second passages are each a channel in the outer peripheral portion of the seat.

In another embodiment, the one or more second passages are each a channel in the inner peripheral portion of the seat.

In another embodiment, the valve member contacting portion comprises a convex portion, an apex of which is for contacting the valve member.

In another embodiment, the valve body contacting portion comprises a concave portion thereby forming the space between the valve body contacting portion and the valve body.

In another embodiment, the inner peripheral portion of the seat is movable towards, and contactable with, the adjacent valve body surface, during reduction of the valve cavity pressure.

In another embodiment, the inner peripheral portion of the seal is movable towards, but not contactable with, the adjacent valve body surface, during reduction of the valve cavity pressure.

In another embodiment, the valve member is a valve ball.

In another embodiment, the one of more first passages comprises four passages spaced equidistantly from one another about an outer perimeter of the seat.

In another embodiment, the one of more second passages comprises four passages spaced equidistantly from one another about the inner perimeter of the seat.

In another embodiment, movement of the inner peripheral portion in the gap is in a direction perpendicular to an axis defining the valve passage.

In another embodiment, the valve body is of a geometry to enable the inner peripheral portion of the seat to move a sealing portion of the seat, forming the sealing point with a sealing portion of the valve body, away from the sealing portion of the valve body upon the valve cavity reaching the threshold pressure, whereby sealing at the sealing point is lost thereby allowing gas to vent from the space through the one or more second passages into the valve passage to reduce the valve cavity pressure. Movement of the portion of the seat forming the sealing point with the valve body away from the valve body may be in a direction perpendicular to an axis defining the valve passage and is along a surface of the valve body.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a ball valve seat arrangement that permits relief of valve cavity pressure. The arrangement includes a valve body for receiving a resilient annular seat. First passages in the seat provide communication between the valve cavity, and a space formed between the seat and the valve body. When the cavity pressure reaches a certain level, a sealing point between the seat and the valve body is lost. Communication is thereby provided between the space and the valve passage to achieve cavity pressure relief.

Figure 4:
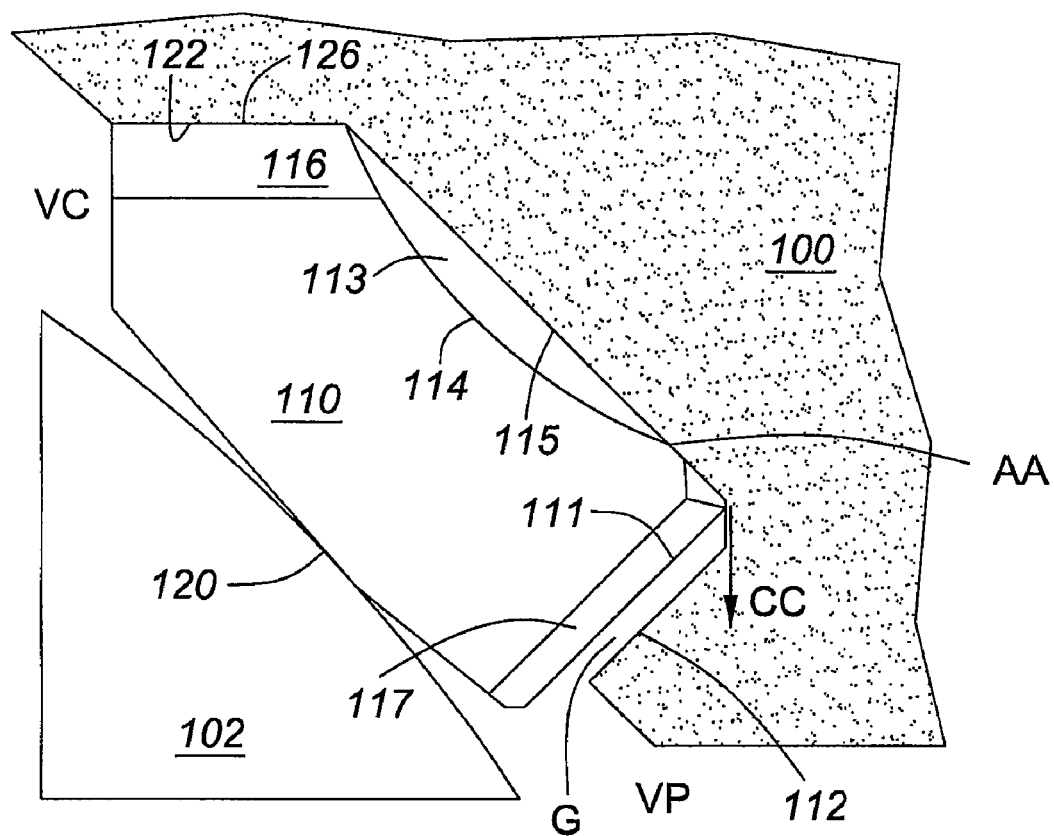
FIG. 4 is a sectional view of a ball valve seat arrangement according to an embodiment of the present invention, in position with a valve ball.

FIG. 4 illustrates a ball valve seat arrangement sharing certain features with the Ripert arrangement discussed above. However, relief of cavity pressure, not possible in Ripert's arrangement, is achieved in the present arrangement.

FIG. 4 illustrates a ball valve seat arrangement including a valve body 100 and a seat 110. The crooked lines generally in the upper and right portions of the valve body 100 are used to indicate indefinite shape. A valve member contacting portion 120 is shown in contact with a valve member 102. The valve member is at least partially spherical and may be a sphere. A gap G between an inner peripheral portion 111 of the seat 110 and an adjacent valve body surface 112 is provided. As with the Ripert design, a space 113 is formed between the concave surface 114 of the seat 110 and an adjacent valve body surface 115. The space 113 is bound by the surfaces 114 and 115 and a seat/valve body sealing point AA. During normal operation of the valve, pressure develops in the valve cavity VC. Without gap G, there would be no way for gas to vent from the valve cavity VC past the seat 110 into the valve passage VP. The valve passage is the passage through which flow occurs. One or more first passages 116 are provided in an outer peripheral portion 122 of the seat affording communication between the valve cavity VC and the space 113. Cavity pressure is the pressure in the valve cavity VC and the space 113. One or more second passages 117 are provided in the inner peripheral portion 111 of the seat and but for the seat/valve body sealing point AA, these passages 117 would communicate the space 113 with the valve passage VP, thus allowing gas to vent from the space 113 through the passages 117 into the valve passage VP. Therefore, it is necessary to lose temporarily the sealing point AA, and that is the purpose of the gap G, which allows the seat to move in the direction CC, along surface 112a, towards the valve body surface 112 when the valve cavity VC is under pressure, whereby the seal moves out of sealing contact with the valve body at point AA. The geometry of the valve body 100 (in particular 112, 112a and 115) and the seat 110 (in particular 111, 114 and 117) enable the movement in the direction CC to lose temporarily the sealing point AA. The illustrated geometry is but one embodiment. Even if the inner peripheral surface 111 moves into abutment with the valve body surface 112, gas is now able to vent from space 113 through passages 117 into the valve passage VP. Movement of the seat "towards" the valve body surface 112, is not limited to directly towards the valve body surface 112. In fact, in FIG. 4 for instance, movement is in the direction CC which is not directly towards the valve body surface 112.

Figure 1:
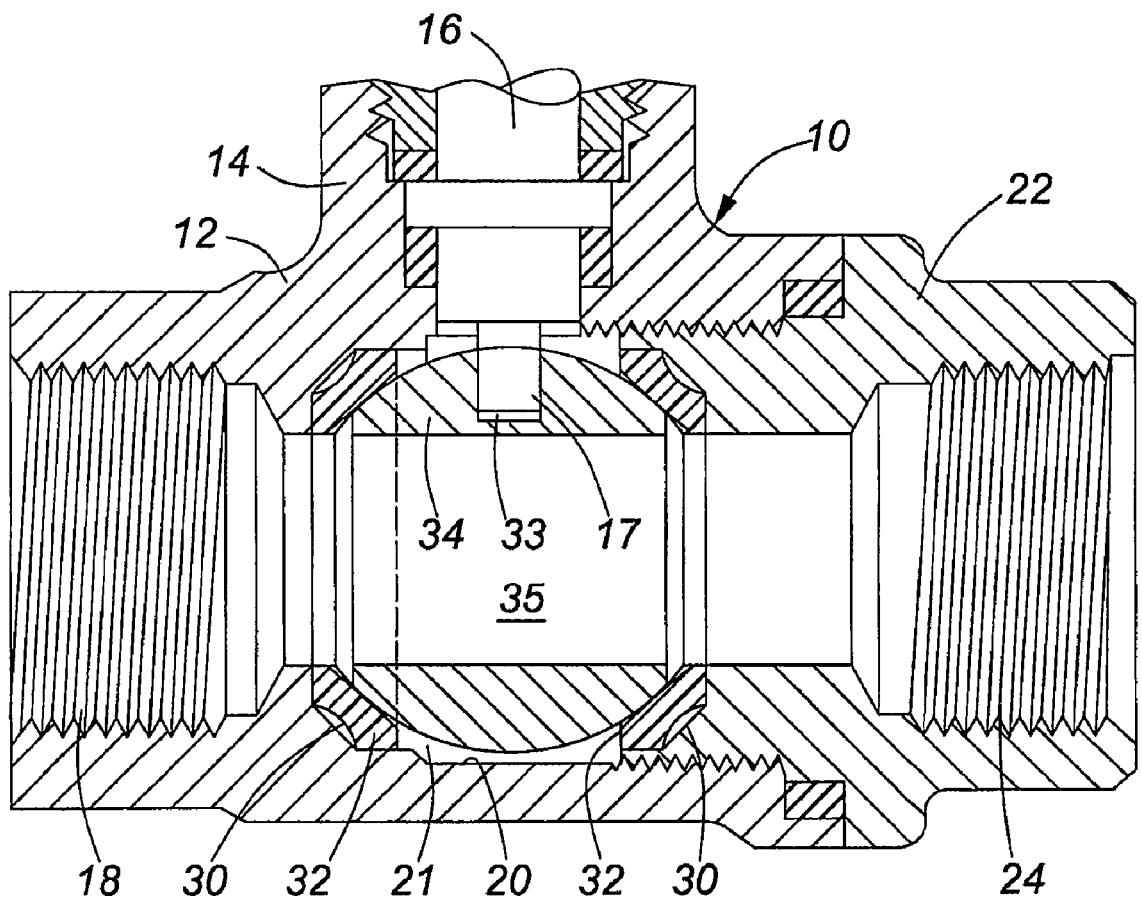
FIG. 1 is a vertical cross-sectional view of a ball valve construction with sealing rings, of U.S. Pat. No. 3,384,341 ("Ripert")
Figure 2:
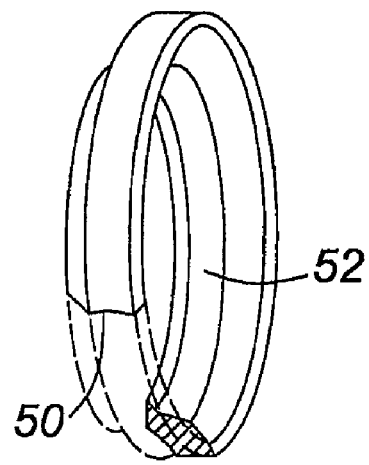
FIG. 2 is a perspective elevation and partially broken view of a sealing ring of U.S. Pat. No. 3,384,341 ("Ripert")
Figure 3:
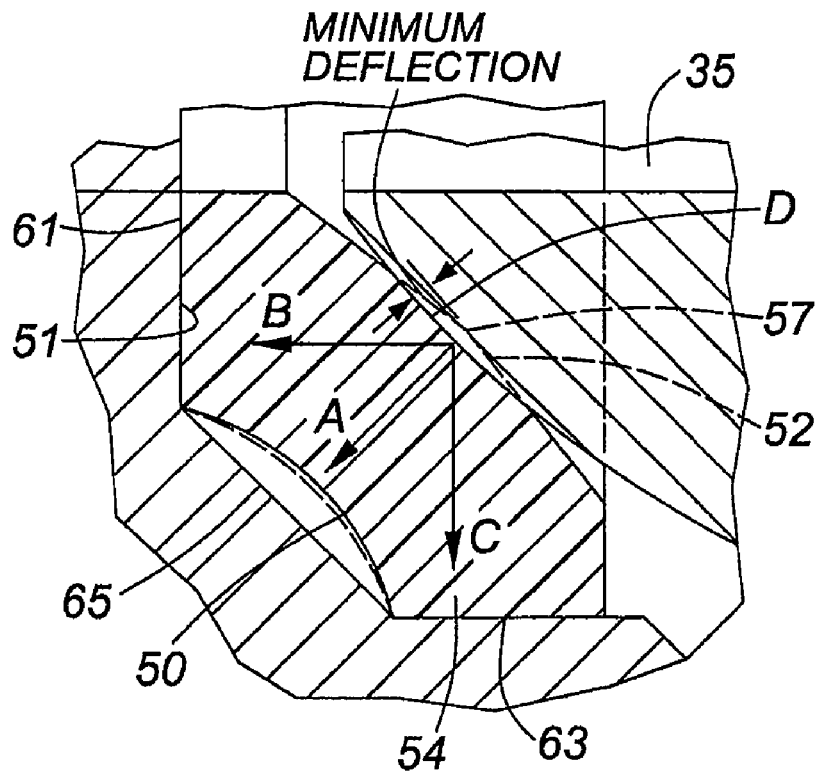
FIG. 3 is a greatly enlarged, somewhat diagrammatic view, partially in cross-section of a portion of a valve body ring accommodating recess surrounding a valve seat, a cross-section of a sealing ring as shown in FIG. 2, and a portion of a ball to illustrate the action of the seal in sealing contact under minimum deflection as would occur with preferred tolerance conditions between opposed valve seats, all of U.S. Pat. No. 3,384,341 ("Ripert")
Figure 5:
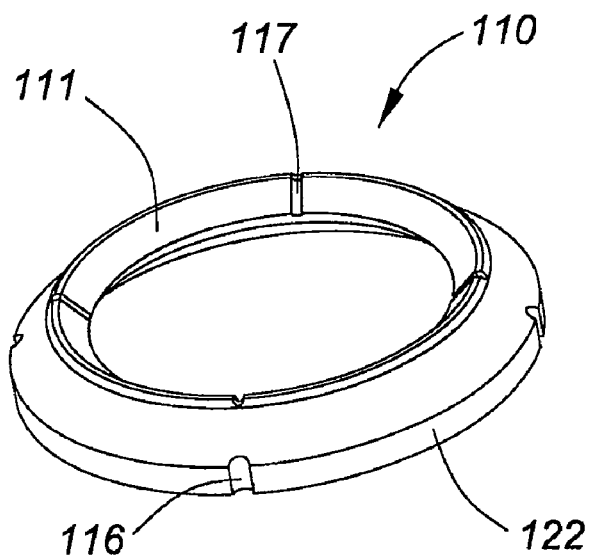
FIG. 5 is a perspective view of a seat for use in a ball valve seat arrangement according to an embodiment of the present invention.

FIG. 5 shows the seat 110 of FIG. 4 in perspective view. Outer peripheral portion 122 for contacting an adjacent valve body surface (126 in FIG. 1) has first passages 116, as described above. Inner peripheral surface 111 is for contacting a valve body surface (112 in FIG. 4) and has second passages 117, as described above. Although four passages 116 and four passages 117 are illustrated, the number of passages is not essential. One passage in each of the outer and inner peripheral portions is possible, together with the temporary sealing point loss, providing the desired cavity pressure relief. The passages are shown as channels in the outer and inner peripheries of the seat, but passages through the seat not being fully exposed are also possible.

While the above discussion has focused on a modification of the Ripert ball valve seat arrangement, relief of cavity pressure may be used with other base designs. To achieve the intended result, a space is formed in some manner between the seat and the adjacent valve body surface. A concaved seat surface adjacent the valve body is but one such configuration. One or more first passages communicate the valve cavity VC with that space at the outside periphery of the seat. One or more second passages communicate that space with the valve passage at the inside periphery of the seat. A seat/valve body sealing point between that space and the second passage(s) is provided. Also, a gap is provided between the inner peripheral portion of the seat and the adjacent valve body surface to allow the seal to move into the gap under cavity pressure acting on the seat, which temporarily destroys the seat/valve body sealing point.

The seat is resilient to achieve the temporary deformation described herein, and may be made of, for instance and without limitation, nylon, Teflon™, and hard rubber. Where a thinner cross-section is used, metal having a sufficient degree of flexibility or resilience to permit deflection may be used, for example stainless steel or the like.

Pressure relief as used herein does not mean only complete pressure relief, by rather includes partial pressure relief. That is "relief" means any reduction in the pressure.

The arrangement described in Ripert is merely provided by way of example to illustrate that those arrangements may be modified to achieve the desired cavity pressure relief. Embodiments of the instant invention are not limited to what is described in Ripert. Further, while a typical ball valve construction was described above in the "Background" section with reference to Ripert, the instant seat arrangements may of course be used with varied ball valve constructions.

In certain prior designs, cavity pressure is relieved by allowing for the sealing contact to be lost temporarily between the seat and the ball to allow venting. Such prior seat arrangements include those disclosed in Canadian Patent No. 1,098,504 (Wright), U.S. Pat. No. 2,930,576 (Sanctuary) and U.S. Pat. No. 4,385,747 (Renaud). This differs from embodiments of the instant invention where sealing contact is temporarily lost between the seat and the valve body.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A ball valve seat arrangement comprising:
   a valve body; and
   a resilient annular seat for sealing between the seat and a valve member, the valve member being at least partially spherical, the seat comprising:
      a valve member contacting portion for contacting the valve member; and
      a valve body contacting portion for contacting the valve body and forming a space therebetween and a sealing point therewith;
   the seat defining one or more first passages for providing communication between a valve cavity and the space;
   the seat defining one or more second passages which, but for the sealing point, would communicate the space with a valve passage to allow gas to vent from the space through the one or more second passages into the valve passage;
   the seat further comprising an inner peripheral portion, being disposed at an inner perimeter of the seat, and being distanced from an adjacent valve body surface defining a gap when the valve cavity is at a pressure less than a threshold pressure, and being movable, in the gap, towards the adjacent valve body surface upon the valve cavity reaching the threshold pressure, whereby sealing at the sealing point is lost thereby allowing gas to vent from the space through the one or more second passages into the valve passage to reduce the valve cavity pressure.

2. The ball valve seat arrangement according to claim 1, wherein the seat further comprises an outer peripheral portion, being disposed at an outer perimeter of the seat, contacting another adjacent valve body surface.

3. The ball valve seat arrangement according to claim 2, wherein the one or more second passages are each a channel in the outer peripheral portion of the seat.

4. The ball valve seat arrangement according to claim 1, wherein the one or more second passages are each a channel in the inner peripheral portion of the seat.

5. The ball valve seat arrangement according to claim 1, wherein the valve member contacting portion comprises a convex portion, an apex of which is for contacting the valve member.

6. The ball valve seat arrangement according to claim 1, wherein the valve body contacting portion comprises a concave portion thereby forming the space between the valve body contacting portion and the valve body.

7. The ball valve seat arrangement according to claim 1, wherein the inner peripheral portion of the seat is movable towards, and contactable with, the adjacent valve body surface, during reduction of the valve cavity pressure.

8. The ball valve seat arrangement according to claim 1, wherein the inner peripheral portion of the seal is movable towards, but not contactable with, the adjacent valve body surface, during reduction of the valve cavity pressure.

9. The ball valve seat arrangement according to claim 7, wherein the valve member is a valve ball.

10. The ball valve seat arrangement according to claim 1, wherein the one of more first passages comprises four passages spaced equidistantly from one another about an outer perimeter of the seat.

11. The ball valve seat arrangement according to claim 1, wherein the one of more second passages comprises four passages spaced equidistantly from one another about the inner perimeter of the seat.

12. The ball valve seat arrangement according to claim 1, wherein movement of the inner peripheral portion in the gap is in a direction perpendicular to an axis defining the valve passage.

13. The ball valve seat arrangement according to claim 1, wherein the valve body is of a geometry to enable the inner peripheral portion of the seat to move a sealing portion of the seat, forming the sealing point with a sealing portion of the valve body, away from the sealing portion of the valve body upon the valve cavity reaching the threshold pressure, whereby sealing at the sealing point is lost thereby allowing gas to vent from the space through the one or more second passages into the valve passage to reduce the valve cavity pressure.

14. The ball valve seat arrangement according to claim 13, wherein movement of the portion of the seat forming the sealing point with the valve body away from the valve body is in a direction perpendicular to an axis defining the valve passage and is along a surface of the valve body.

* * * * *